(12) United States Patent
Hasegawa et al.

(10) Patent No.: US 9,848,096 B2
(45) Date of Patent: Dec. 19, 2017

(54) DEVICE, METHOD, AND STORAGE MEDIUM FOR SUPPORTING IMAGING WORK

(71) Applicant: CASIO COMPUTER CO., LTD., Shibuya-ku, Tokyo (JP)

(72) Inventors: Hirokazu Hasegawa, Koganei (JP); Naoaki Misaki, Tokyo (JP); Ryo Nimura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/250,409

(22) Filed: Aug. 29, 2016

(65) Prior Publication Data

US 2017/0099404 A1 Apr. 6, 2017

(30) Foreign Application Priority Data

Oct. 6, 2015 (JP) .................. 2015-198565

(51) Int. Cl.
*H04N 1/04* (2006.01)
*H04N 1/00* (2006.01)
*B42D 9/04* (2006.01)

(52) U.S. Cl.
CPC .......... *H04N 1/00567* (2013.01); *B42D 9/04* (2013.01); *H04N 1/00824* (2013.01); *H04N 1/04* (2013.01); *H04N 2201/0081* (2013.01); *H04N 2201/0422* (2013.01); *H04N 2201/0434* (2013.01)

(58) Field of Classification Search
CPC ...... G10L 13/00; G06K 9/20; G06K 2209/01; G06Q 30/06; G06Q 50/20; Y10S 707/99931; Y10S 707/99943; Y10S 707/99945; G09B 21/001; B42D 9/04; H04N 1/195; H04N 1/19594; H04N 2201/0434; H04N 2201/044
USPC ..... 382/181, 182, 114, 187; 348/62, E7.085; 704/260, E13.008; 707/999.001, 999.1, 707/999.102, 999.104; 358/494; 434/317
See application file for complete search history.

(56) References Cited

U.S. PATENT DOCUMENTS 5,798,841 A * 8/1998 Takahashi ............ H04N 1/1017
358/296
8,982,428 B2   3/2015 Hasegawa
9,421,810 B2   8/2016 Hasegawa
(Continued)

FOREIGN PATENT DOCUMENTS

| JP | 09018619 A | 1/1997 |
| JP | 2014117893 A | 6/2014 |
| JP | 2015006754 A | 1/2015 |

OTHER PUBLICATIONS

Japanese Office Action (and English translation thereof) dated Jul. 12, 2017 issued in counterpart Japanese Application No. 2015-198565.

*Primary Examiner* — Negussie Worku
(74) *Attorney, Agent, or Firm* — Holtz, Holtz & Volek PC

(57) ABSTRACT

A user is allowed to set contents of imaging work for digitization of a book using a page turning device to turn over each page of the book in a spread state from an original position to a destination position and settings of the imaging work are stored in advance. When a user commands initiation of the imaging work, the stored settings are confirmed and an imaging operation screen to present, to the user, guidance information related to an imaging procedure corresponding to the settings is separately displayed.

20 Claims, 12 Drawing Sheets

(56) References Cited

U.S. PATENT DOCUMENTS

| | | | |
|---|---|---|---|
| 2009/0237367 A1* | 9/2009 | Ryu | G06F 3/0483 345/173 |
| 2010/0296138 A1* | 11/2010 | Jakes | B42D 9/04 358/494 |
| 2013/0159915 A1* | 6/2013 | Kim | G06F 3/017 715/776 |
| 2014/0375802 A1 | 12/2014 | Hasegawa | |
| 2015/0355797 A1* | 12/2015 | Shinkai | G06F 3/0416 345/173 |
| 2015/0375557 A1* | 12/2015 | Hasegawa | B42D 9/04 358/498 |
| 2016/0080597 A1* | 3/2016 | Hasegawa | H04N 1/00822 358/1.2 |
| 2016/0167419 A1* | 6/2016 | Hasegawa | B42D 9/06 281/15.1 |
| 2017/0004752 A1* | 1/2017 | Hasegawa | B42D 9/04 |
| 2017/0046019 A1* | 2/2017 | Hasegawa | G06F 3/0482 |
| 2017/0066274 A1* | 3/2017 | Hasegawa | H04N 1/19594 |

* cited by examiner

DEVICE, METHOD, AND STORAGE MEDIUM FOR SUPPORTING IMAGING WORK

CROSS-REFERENCE TO RELATED APPLICATION

This application is based upon and claims the benefit of priority from Japanese Patent Application No. 2015-198565, filed Oct. 6, 2015, the entire contents of which are incorporated herein by reference.

BACKGROUND

1. Technical Field

The present invention relates to a technique for supporting imaging work associated with digitization of books.

2. Related Art

Document camera systems for turning over pages of books (e.g. book or magazine), imaging and digitizing each page by an imaging device while the pages are turned over, and storing digital data of the plurality of pages as a document file are known (see JP 2014-117893 A or JP 2015-6754 A, for example). In the above document camera systems, each page of a book in a spread state is mechanically turned over from an original position (one side of a spread page) to a destination position (the other side of the spread page) by a tip of a freely-rotatable arm, thereby allowing for digitizing an arbitrary book.

SUMMARY

A first aspect of the present invention is a device for supporting imaging work, the device including: a setting unit to allow a user to set contents of imaging work for digitization of a book using a page turning device to turn over each page of the book in a spread state from an original position to a destination position; and a presentation unit to present, to the user, guidance information related to an imaging procedure corresponding to the contents of the imaging work set by the user.

A second aspect of the present invention is a method for supporting imaging work, the method including the steps of: allowing a user to set contents of imaging work for digitization of a book using a page turning device to turn over each page of the book in a spread state from an original position to a destination position; and presenting, to the user, guidance information related to an imaging procedure corresponding to the contents of the imaging work set by the user.

A third aspect of the present invention is a non-transitory computer-readable storage medium having stored thereon a program executable by a processor, the program controlling the processor to perform functions including: allowing a user to set contents of imaging work for digitization of a book using a page turning device to turn over each page of the book in a spread state from an original position to a destination position; and presenting, to the user via a predetermined information output device, guidance information related to an imaging procedure corresponding to the contents of the imaging work set by the user.

BRIEF DESCRIPTION OF THE DRAWINGS

Considering the following detailed descriptions along with the following drawings fosters deeper understanding of the present application.

DETAILED DESCRIPTION

Hereinafter, embodiments of the present invention will be described with reference to the drawings.

Figure 1:
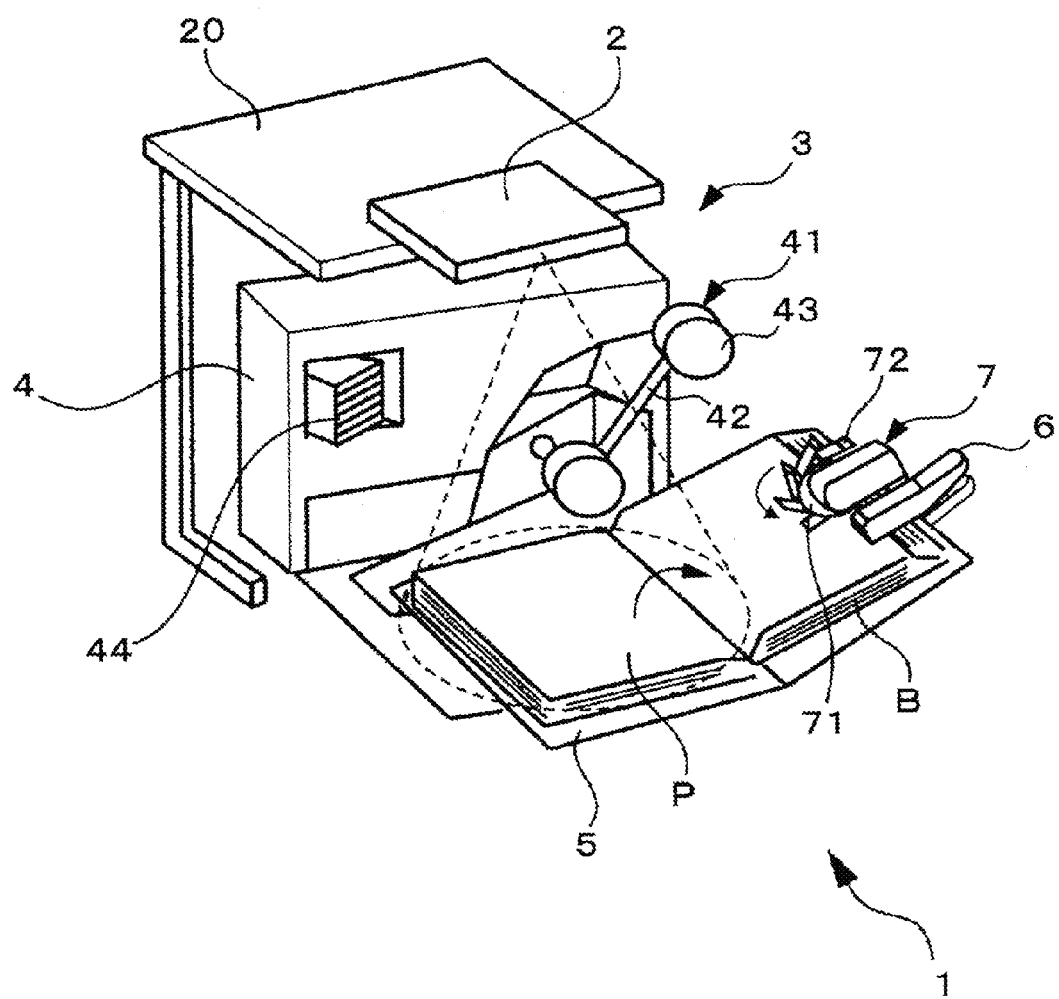
FIG. 1 is a perspective view illustrating a schematic configuration of a document camera system according to an embodiment of the present invention.

FIG. 1 is a perspective view illustrating a schematic configuration of a document camera system 1 according to an embodiment of the present invention. The document camera system 1 includes a tablet 2 and a page turning device 3.

The page turning device 3 includes a holder 5 to hold an open book B, a device main body 4 to turn over a page P by holding the page P in an original position of the book B on the holder 5 and releasing the held page P in a destination position of the page P, a clip 6 freely attachable to and detachable from the holder 5, and a page receiver 7.

The device main body 4 includes a turning mechanism 41 to mechanically turn over the page P and an air blower 44 to create an air flow toward the destination position above the page P in the original position during operation of the turning mechanism 41 and to prevent the page P, having been turned over, from returning by an air flow pressure.

The turning mechanism 41 includes an arm 42 freely rotatable within a predetermined angular range and an adhesive roller 43 provided at a tip thereof. The adhesive roller 43 includes an elastic member such as a sponge or rubber attached to the tip of the arm 42 in a freely rotatable manner and an adhesive member, having a weak adhesive power similar to that of an adhesive tape for temporary fixation, wound around a peripheral surface of the elastic member.

In the page turning device 3, the arm 42 of the turning mechanism 41 rotates about a base end counterclockwise and clockwise and the adhesive roller 43 accordingly travels between the original position (left side of the spread page in FIG. 1) and the destination position (right side of the spread page in FIG. 1) following an arc-shaped trajectory above the open book B, thereby allowing for turning over the page P in the original position to the destination position.

Figure 3:
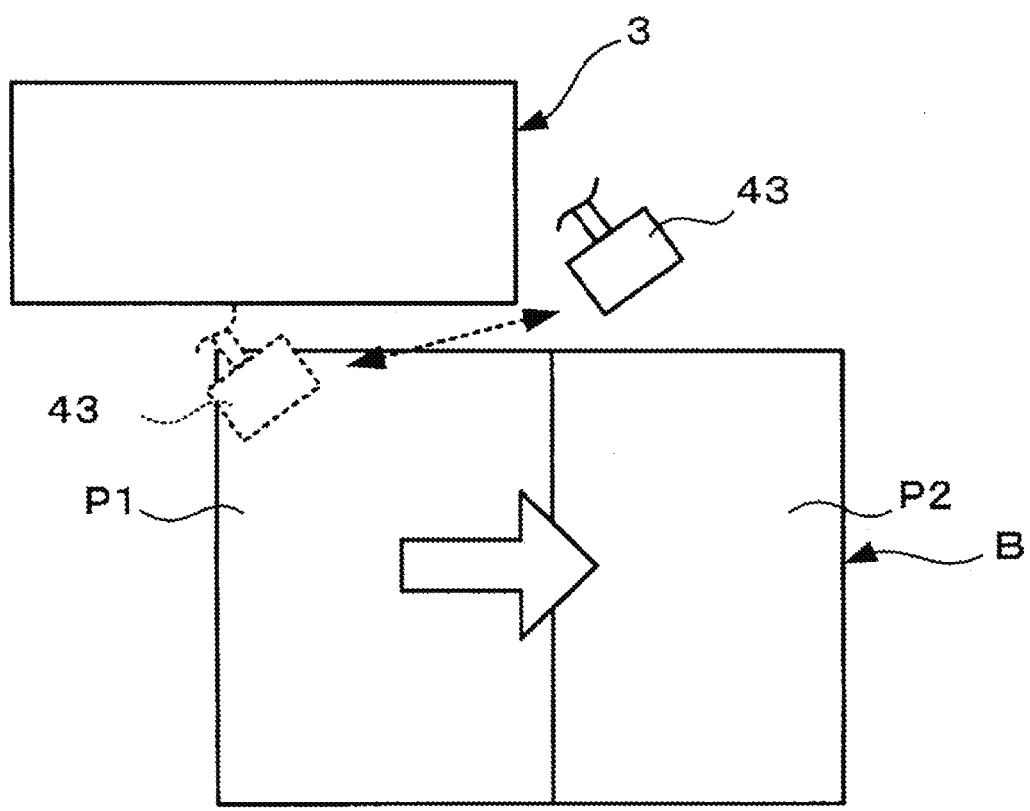
FIG. 3 is a plan view illustrating positional relation between a trajectory of an adhesive roller and a book.

The operation of turning over a page by the turning mechanism 41 is specifically described as follows. FIG. 3 is a plan view illustrating positional relation between a trajectory of the adhesive roller 43 and the book B. While the arm 42 rotates counterclockwise and clockwise, the adhesive roller 43 travels between a position illustrated in a solid line and a position illustrated in a broken line in FIG. 3. Incidentally, a position of the adhesive roller 43 when the arm 42 is halted, that is an initial position, is the position illustrated in the solid line, which is a little apart from an upper edge of the book B.

Figure 4A:
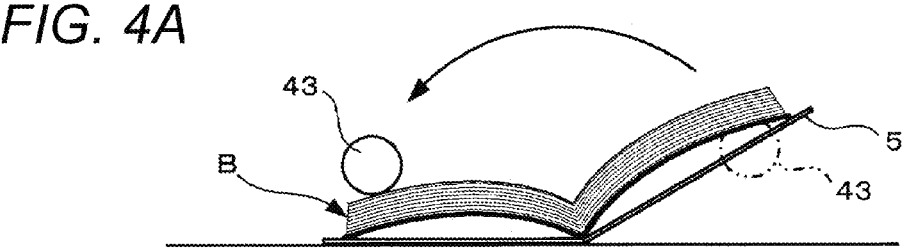
FIGS. 4A, 4B, 4C, and 4D are front views illustrating operation of turning over a page by an arm.
Figure 4B:
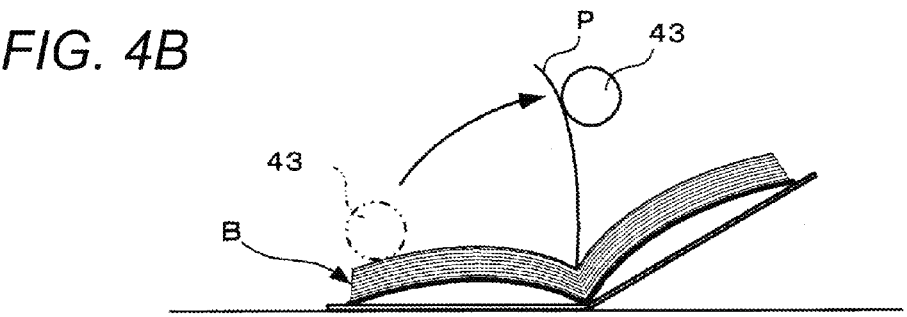

As illustrated in FIG. 4A, when the arm 42 rotates counterclockwise, the adhesive roller 43 abuts against an end portion of the page P in the original position, thereupon the end portion of the page P is held by the adhesive roller 43 by a weak adhesive power. When the arm 42 starts to rotate clockwise, the adhesive roller 43 travels toward the initial position while holding the end portion of the page P, thereby moving the end portion of the page P toward the destination position (FIG. 4B).

Figure 4C:
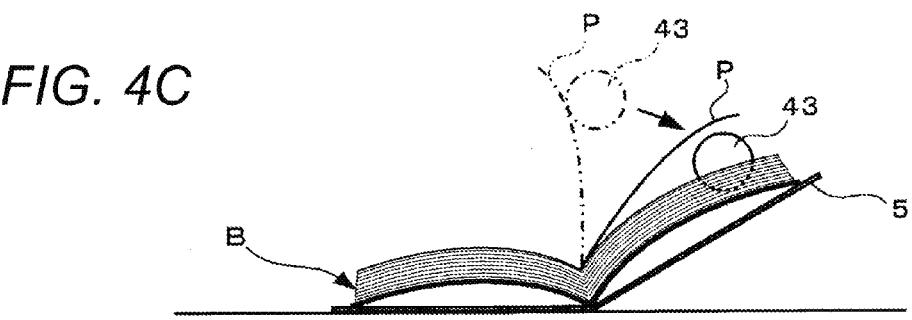
Figure 4D:

When the adhesive roller 43 then travels close to the initial position, the adhesive roller 43 travels away (escapes) from the book B and thereby the adhesive roller 43 is detached from the page P (FIG. 4C). Thereafter, the adhesive roller 43 returns to the initial position while the page P detached from the adhesive roller 43 travels to the destination position (FIG. 4D).

Incidentally, while the arm 42 turns over the page P, the air flow blown from the air blower 44 prevents the page P having traveled to the destination position from returning.

The clip 6 and the page receiver 7 are auxiliary tools to be attached to the holder 5. The clip 6 fixes, to the destination position, pages piling at the destination position. The page receiver 7 rotates a roller 71, provided with wings 72 made of a soft material therearound, in the direction illustrated by an arrow in FIG. 1 by an internal motor (not shown). The page receiver 7 bites the end portion of the page P detached from the adhesive roller 43 in the vicinity of the destination position and thereby ensures the page P to travel to the destination position.

Meanwhile, the tablet 2 is a portable information processing terminal including a camera (imaging unit to be described later). The tablet 2 is disposed above the book (e.g. book or magazine) B using a stand 20 and thereby takes a picture of the page P in the original position of the book B as an imaging object. Incidentally, the tablet 2 and the page turning device 3 are capable of communicating via near distance wireless communication adaptors such as Bluetooth (registered trademark) or Wi-Fi (registered trademark) included therein.

Figure 2:
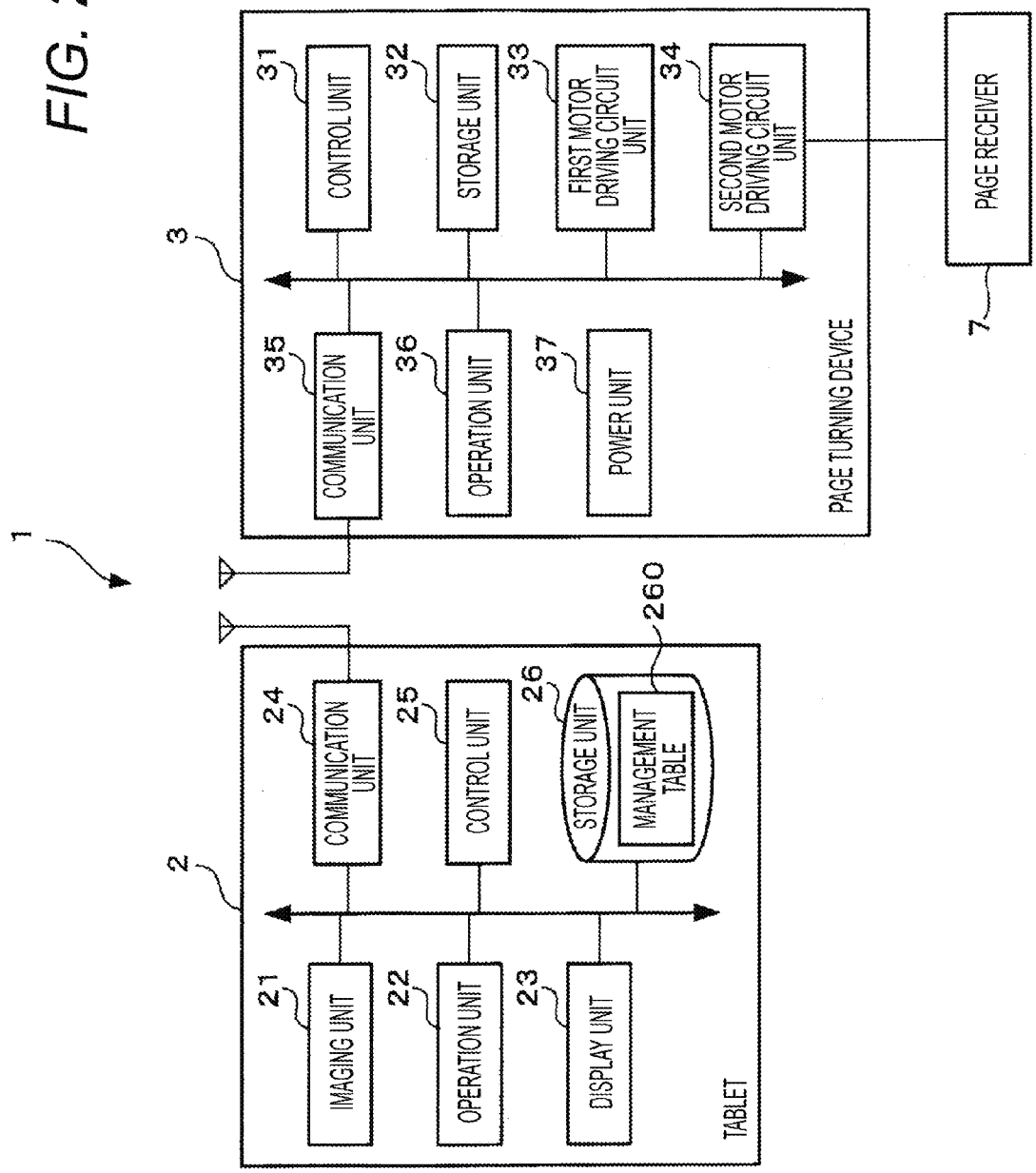
FIG. 2 is a block diagram illustrating main units of an electric configuration of the document camera system.

FIG. 2 is a block diagram illustrating main units of an electric configuration of the tablet 2 and the page turning device 3. First, an electric configuration of the page turning device 3 will be described.

The page turning device 3 mainly includes a control unit 31, a storage unit 32, a first motor driving circuit unit 33, a second motor driving circuit unit 34, a communication unit 35, an operation unit 36, and a power unit 37. The storage unit 32 includes a read only memory (ROM) storing various programs and a random access memory (RAM) where the programs are deployed.

The operation unit 36 includes various switches such as a power source switch. The first motor driving circuit unit 33 includes a motor to drive the turning mechanism 41, a motor to drive a fan included in the air blower 44, a motor driver to drive those motors, and the like. The second motor driving circuit unit 34 includes a motor driver to drive an internal motor of the page receiver 7.

The communication unit 35 functions as a communication interface with the tablet 2 and performs connection with the tablet 2 by a communication system such as Bluetooth (registered trademark) or Wi-Fi (registered trademark). The power unit 37 supplies power to the respective units 31 to 36.

The control unit 31 stores, in the storage unit 32, operation parameters received from the tablet 2 via the communication unit 35. The control unit 31 further controls the first motor driving circuit unit 33 and the second motor driving circuit unit 34 in cooperation with the tablet 2 based on the operation parameters according to the program stored in the storage unit 32 and drives the arm 42, the fan included in the air blower 44, and the page receiver 7.

Next, an electric configuration of the tablet 2 will be described. The tablet 2 mainly includes an imaging unit 21, an operation unit 22, a display unit 23, a communication unit 24, a control unit 25, and a storage unit 26.

The imaging unit 21 is a camera capable of imaging a page image of the book B or the like. The imaging unit 21 has an optical system including a lens as well as an imaging element formed by a charge coupled device (CCD), a complementary metal oxide semiconductor (CMOS), or the like. An optical image incident via the lens is photoelectrically converted into analog image signals by the imaging element. After color separation or gain adjustment for each color component is performed, the analog signals are converted into digital data. Incidentally, the lens and the imaging element are included on the back side of the tablet 2 which is not shown in FIG. 1.

The display unit 23 has a display monitor such as a liquid crystal display (LCD) or an organic electro luminescence (EL) display and displays the page image imaged by the imaging unit 21, various information, or the like on a screen of the display monitor.

The operation unit 22 includes a minimum operation switch such as a power source key (not shown) and a touch panel integrally provided on a surface of the display monitor of the display unit 23 and forming a surface of the tablet 2. The operation unit 22 supplies operation information of the tablet 2 by a user to the control unit 25.

The communication unit 24 functions as a communication interface with the page turning device 3 and performs connection with the page turning device 3 by a communication system such as Bluetooth (registered trademark) or Wi-Fi (registered trademark).

The control unit 25 includes a central processing unit (CPU) and a peripheral circuit thereof, a random access memory (RAM), or the like and controls the respective units of the tablet 2.

The storage unit 26 is implemented with for example a semiconductor memory and stores various application programs, various data generated by the control unit 25 in the process of executing the program, various setting data used for the application program, or the like. The application programs include a document management program for imaging each page of a book using the page turning device 3, storing, in the storage unit 26, page images acquired by imaging as a document file, and viewing or editing the stored document file.

Furthermore, while the document file is generated, the storage unit 26 stores a series of page images including captured images where the respective pages of a book or the like is imaged and captured images where each of a front cover, an endpaper (of a back cover), a back cover, and an endpaper (of the front cover) of the book is imaged.

The storage unit 26 is further secured with a region to store a plurality of management tables 260 for managing the document file or the series of page images for every book. The management table 260 stores basic information for the series of page images before integration as the document file. The basic information includes information showing correspondence relation between the respective page images and the respective pages of the book, a title and the number of pages of the book, a data volume of the page images for each book, and the like.

In the document camera system 1 configured in the above manner, when a user activates the document management program in the tablet 2, the tablet 2 and the page turning device 3 are wirelessly connected. In this state, the tablet 2 is disposed above the page turning device 3 as illustrated in FIG. 1. Operating the tablet 2 in this state allows for imaging the respective pages of the book B.

Imaging work upon imaging the respective pages of the book B includes imaging work of each of a front cover, an endpaper (of the front cover), left pages, right pages, a back cover, and an endpaper (of the back cover). In the imaging work of the left pages and the right pages, the arm 42 of the page turning device 3 is caused to repeat the operation of turning over a page illustrated in FIGS. 4A to 4D while only the left pages or the right pages are automatically imaged continuously.

The series of page images acquired by imaging can be subjected to various editing work such as trimming by operation of the tablet 2 by the user. Moreover, operation of the tablet 2 by the user allows for integrating the series of page images after editing into a single file and storing in the tablet 2 as a document file of a predetermined format.

Figure 5:
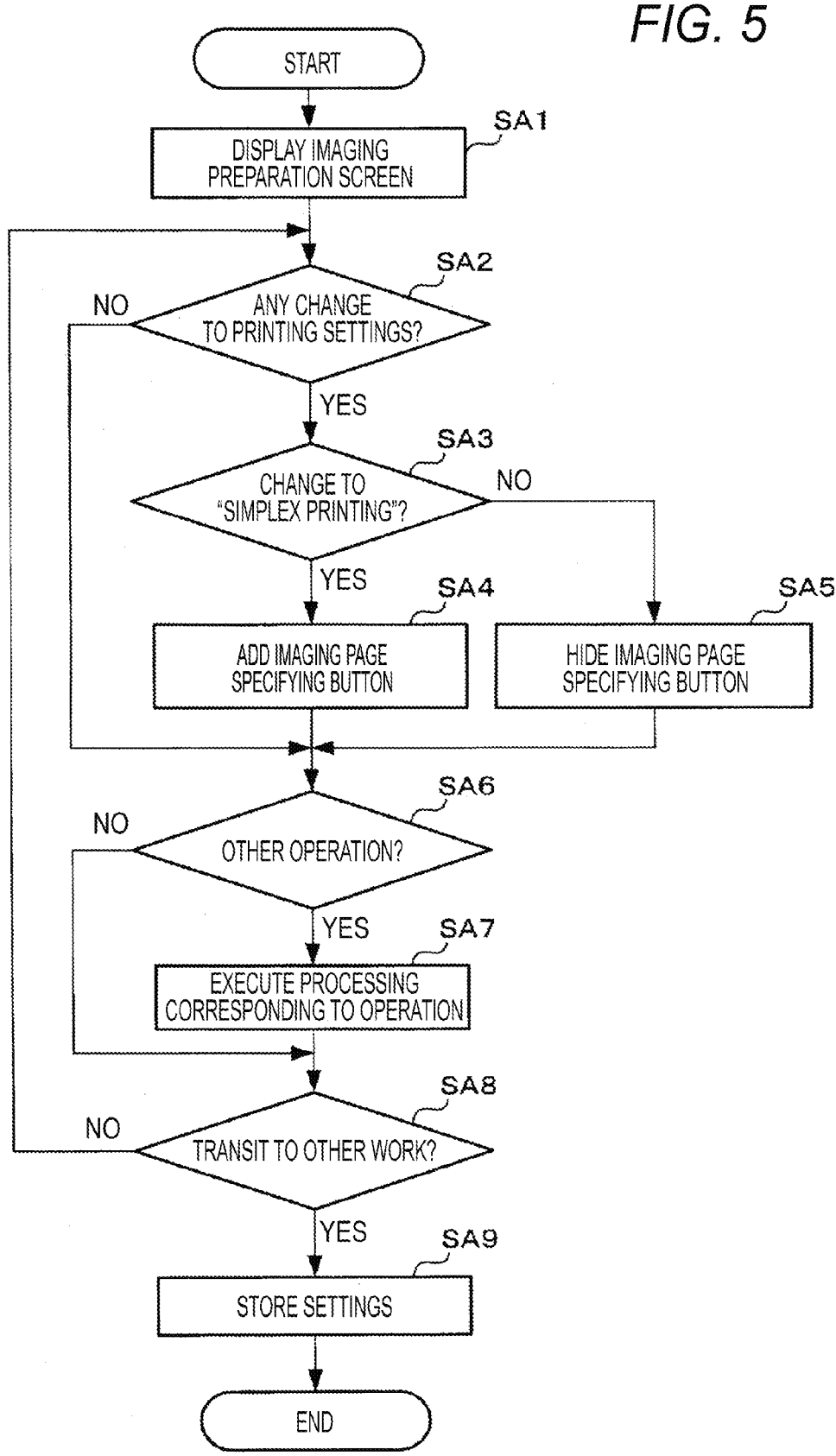
FIG. 5 is a flowchart illustrating imaging preparation processing in a tablet.

Hereinafter, operation of the tablet 2 will be described. FIG. 5 is a flowchart illustrating imaging preparation processing executed by the control unit 25 according to the document management program when the user, after activation of the document management program, commands initiation of generation work of the document file from an operation menu screen displayed on the tablet 2.

Figure 6:
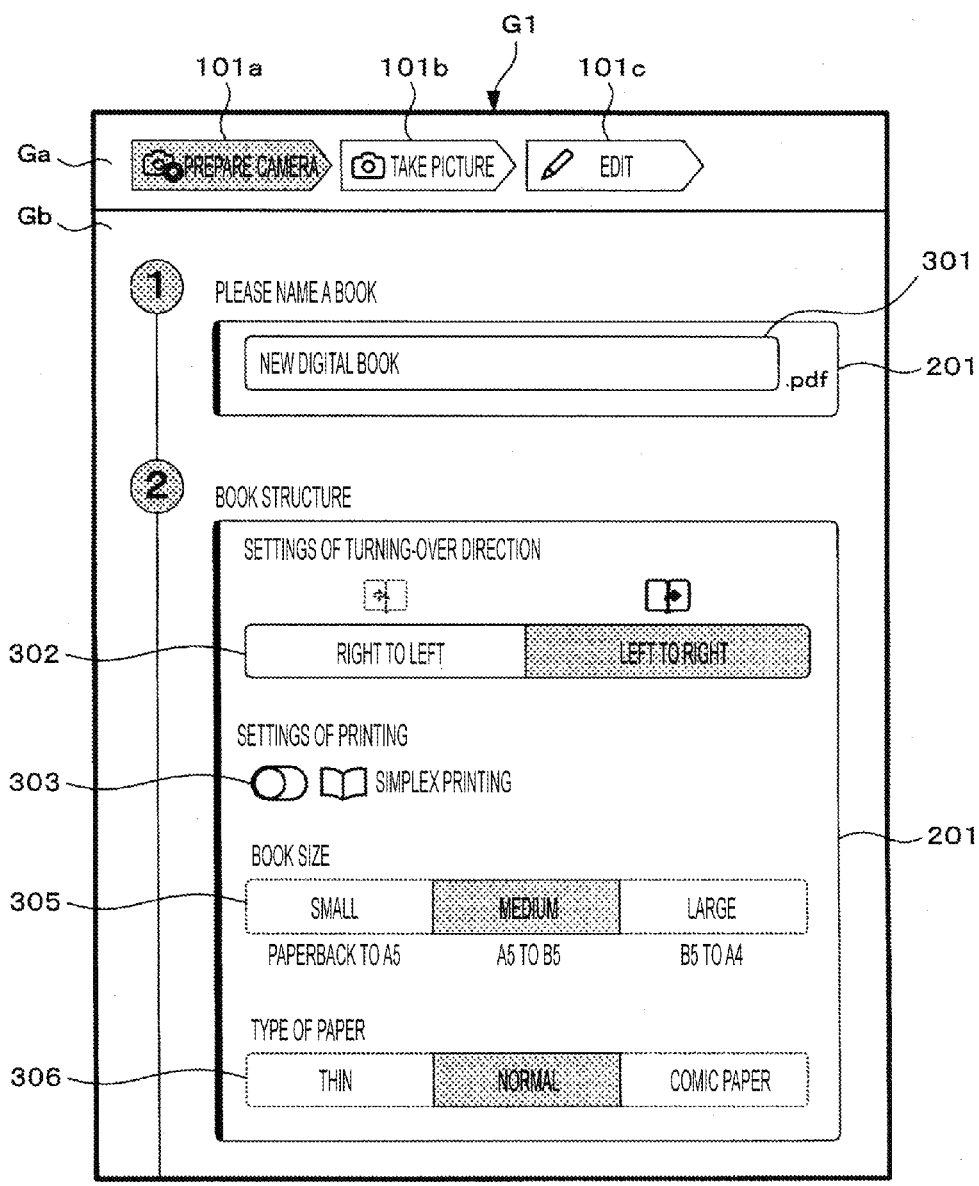
FIG. 6 is a diagram illustrating an imaging preparation screen when an imaging object is set to duplex printing pages.

The control unit 25 initiates the imaging preparation processing and then immediately displays an imaging preparation screen G1 illustrated in FIG. 6 on the display unit 23 (step SA1). The imaging preparation screen G1 is an operation screen for performing setting related to the contents of imaging work corresponding to a book to be digitized, that is, a book as an imaging object, or various preparation works preceding imaging including setting of the contents of the operation of the page turning device 3. Incidentally, setting of the contents of the operation of the page turning device 3 includes setting of use of the page receiver 7 and the arm 42, or setting related to the air (air blower 44) and the operation of the page receiver 7 and the arm 42.

The imaging preparation screen G1 includes a fixed region Ga secured in the upper portion of the screen and a scrollable region Gb secured therebelow. The fixed region Ga is commonly secured in other screens displayed on the display unit 23 upon each work in the generation work of the document file. The fixed region Ga is arranged with a first work selection button 101a, a second work selection button 101b, and a third work selection button 101c, which are used for a transition command to each work, and expressly showing the current work contents.

The first to third work selection buttons 101a to 101c include letters "prepare camera", "take picture", and "edit", respectively, representing the work contents and marks expressing the work contents, which are displayed in display colors predetermined corresponding to the work contents. On the imaging preparation screen G1, the first work selection button 101a is reversely displayed, thereby expressly showing that the current work contents are imaging preparation.

Meanwhile, the scrollable region Gb is arranged with a plurality of work item areas 201 provided for each of the preparation works. In the scrollable region Gb, display contents are scrolled according to scrolling operation by the user. Specifically, the work item area 201 that is not displayed is display as appropriate according to scrolling operation. Incidentally, unlike the present embodiment, the scrollable region Gb may display as appropriate a plurality of pages arranged with a certain work item area 201 according to operation by a user to switch pages.

FIG. 6 is a diagram illustrating a state of the imaging preparation screen G1 upon initiation of the imaging preparation processing. Upon initiation of the imaging preparation processing, displayed as the work item areas 201 are a work item area including a text input field 301 to input a title of a book and a work item area for setting information of a plurality of items related to a structure of the book. Setting items related to the structure of the book include "turning-over direction", "printing", "book size", and "type of paper".

The "turning-over direction" is information related to a binding direction of the book (left binding or right-binding). Operation of a turning-over direction setting button 302 allows for setting "right to left" or "left to right". Here, "right to left" is a turning-over direction corresponding to a left-binding book (such as a book a body of which is written horizontally) while "left to right" is a turning-over direction corresponding to a right-binding book (such as a book a body of which is written vertically or a comic book).

The "printing" is information related to an imaging object in the book. Operation of a switching button 303 allows for setting whether the imaging object is "simplex printing", that is, setting the imaging object as "simplex printing" or "duplex printing". Here, the "duplex printing" refers to all faces of respective pages, a front cover, a back cover, and the like of the book while the "simplex printing" refers to one side of the faces thereof.

Figure 7:
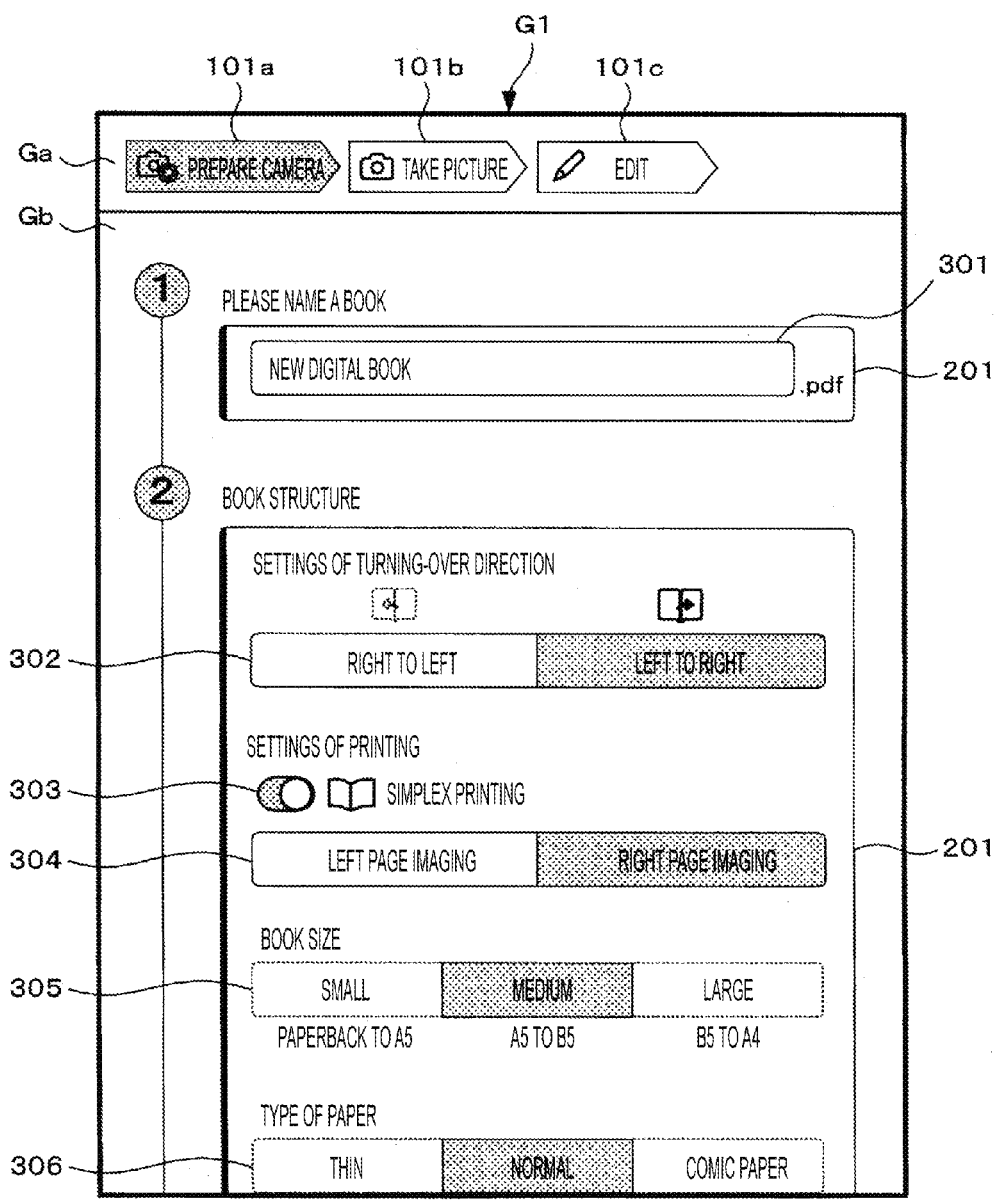
FIG. 7 is a diagram illustrating the imaging preparation screen when the imaging object is set to simplex printing pages.

FIG. 6 is a diagram illustrating an initial state where the imaging object is not set to "simplex printing", that is, a state where the imaging object is set to "duplex printing". When the imaging object is set to "simplex printing", as illustrated in FIG. 7, an imaging page specifying button 304 for setting the imaging object to left pages or right pages is further displayed immediately below the switching button 303. Here, the left page and the right page refer to a left side page and a right side page, respectively, of a book in a spread state.

The "book size" can be set to "small" (corresponds to the paperback to A5 sizes), "medium" (corresponds to the A5 to B5 sizes), or "large" (corresponds to the B5 to A4 sizes) by operation of a size setting button 305. The "type of paper" is information related to a type such as the thickness of papers of the body pages (pages printed with the body including preface, postscript, or the like) of the book. The "type of paper" can be set to "thin", "normal", or "comic paper" by operation of a type setting button 306.

After displaying the imaging preparation screen G1 as illustrated in FIG. 5, if the user changes setting of printing (YES in step SA2) and if it is a change to "simplex printing", (YES in step SA3), the control unit 25 adds the imaging page specifying button 304 to the imaging preparation screen G1 as illustrated in FIG. 7 (step SA4). Here, the control unit 25 turns the switching button 303 to an on-state. On the other hand, if it is a change to "duplex printing", (NO in step SA3), the control unit 25 hides the imaging page specifying button 304 from the imaging preparation screen G1 as illustrated in FIG. 6 (step SA5). Here, the control unit 25 turns the switching button 303 to an off-state.

Furthermore, if the user performs operation other than changing the setting of printing while the imaging preparation screen G1 is displayed (YES in step SA6), the control unit 25 executes processing corresponding to the operation. For example when a title of the book is input, the input letters are displayed in the text input field 301. When a setting item related to the structure of the book other than "printing", that is, one of settings of "turning-over direction", "book size", and "type of paper", is changed, the turning-over direction setting button 302, the imaging page specifying button 304, the size setting button 305, and the type setting button 306 are changed to a state showing the settings after the change. If scrolling operation is performed, the display contents in the scrollable region Gb are scrolled accordingly. Moreover, various processing corresponding to operation related to preparation works preceding imaging other than the above is performed.

Thereafter, the control unit 25 repeats the processing of step SA2 and the subsequent steps until the user commands transition to other work, that is, until transition to actual imaging work is commanded by touching operation of the second work selection button 101b or transition to editing work is commanded by touching operation of the third work selection button 101c (NO in step SA8).

When transition to other work is commanded (YES in step SA5), the control unit 25 stores the contents of imaging work having been set on the imaging preparation screen G1 in the storage unit 26 (step SA9) and then terminates the imaging preparation processing.

Figure 8:
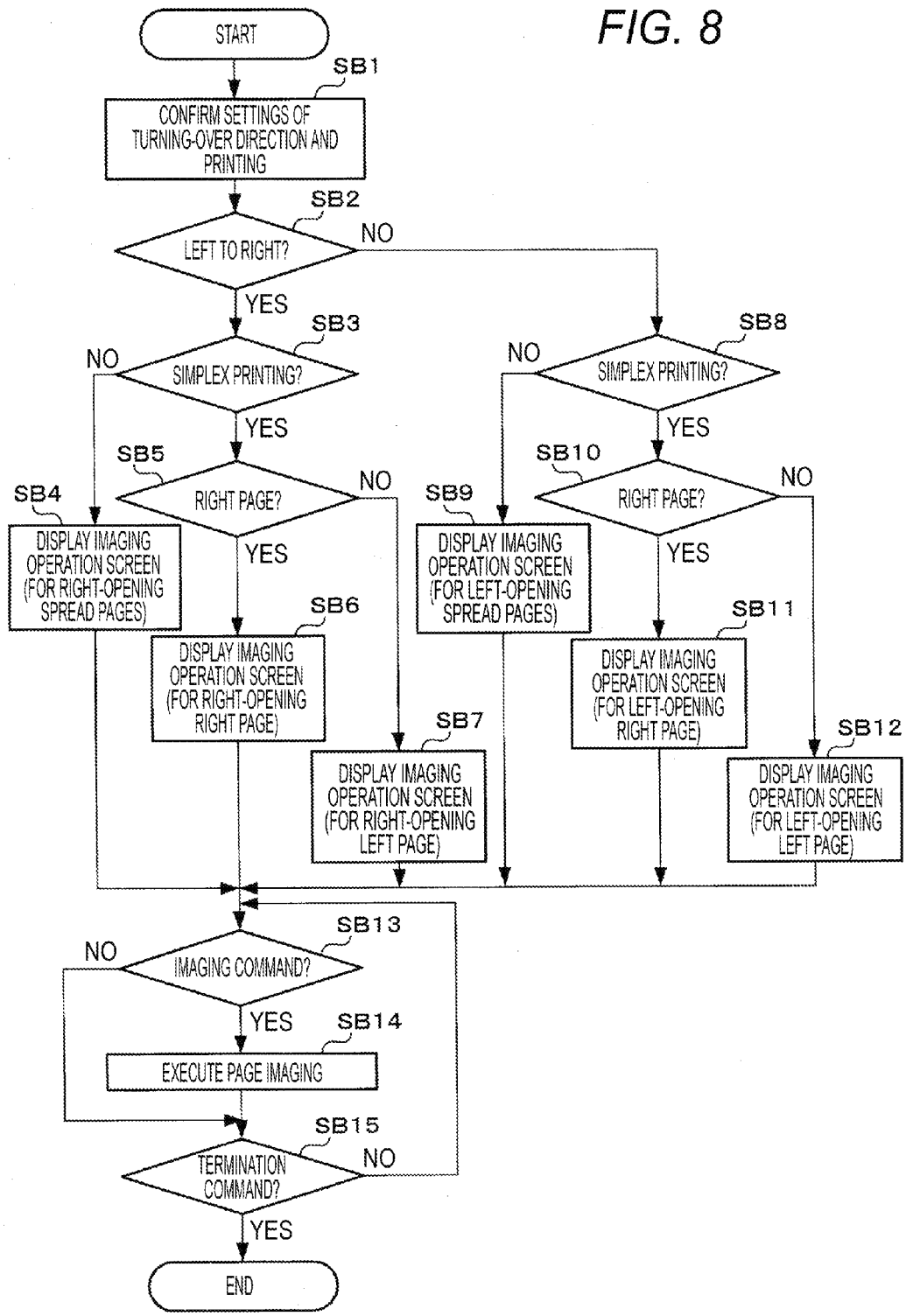
FIG. 8 is a flowchart illustrating imaging processing in the tablet.

FIG. 8 is a flowchart illustrating imaging processing executed by the control unit 25 according to the document management program after termination of the imaging preparation processing according to, for example, a command to transit to imaging work by the user.

Upon initiation of imaging processing, the control unit 25 confirms settings of "turning-over direction" and "printing" having been stored in the storage unit 26 in the latest imaging preparation processing (step SB1) and then performs the following processing according to the confirmed settings.

That is, if setting of "turning-over direction" is "left to right" (YES in step SB2) and setting of "printing" is not "simplex printing" but "duplex printing" (NO in step SB3), the control unit 25 displays the imaging operation screen for right-opening spread pages on the display unit 23 (step SB4).

If setting of "turning-over direction" is "left to right" (YES in step SB2), setting of "printing" is "simplex printing" (YES in step SB3), and the imaging object is right pages (YES in step SB5), the control unit 25 displays the imaging operation screen for right-opening right pages on the display unit 23 (step SB6). Conversely, if the imaging object is left pages (NO in step SB5), the control unit 25 displays the imaging operation screen for right-opening left pages on the display unit 23 (step SB7).

On the other hand, if setting of "turning-over direction" is "right to left" (NO in step SB2) and setting of "printing" is not "simplex printing" but "duplex printing" (NO in step SB8), the control unit 25 displays the imaging operation screen for left-opening spread pages on the display unit 23 (step SB9).

If setting of "turning-over direction" is "right to left" (NO in step SB2), setting of "printing" is "simplex printing" (YES in step SB8), and the imaging object is right pages (YES in step SB10), the control unit 25 displays the imaging operation screen for left-opening right pages on the display unit 23 (step SB11). Conversely, if the imaging object is left pages (NO in step SB10), the control unit 25 displays the imaging operation screen for left-opening left pages on the display unit 23 (step SB12).

Here, each of the imaging operation screens (for right-opening spread pages, right-opening right pages, right-opening left pages, left-opening spread pages, left-opening right pages, and left-opening left pages) displayed on the display unit 23 in the above processing will be described. Each of the imaging operation screens presents, to the user at a time, an imaging procedure including a plurality of imaging steps corresponding to the settings of "turning-over direction" and "printing" and further allows the user to separately command imaging in each of the imaging steps.

Figure 9:
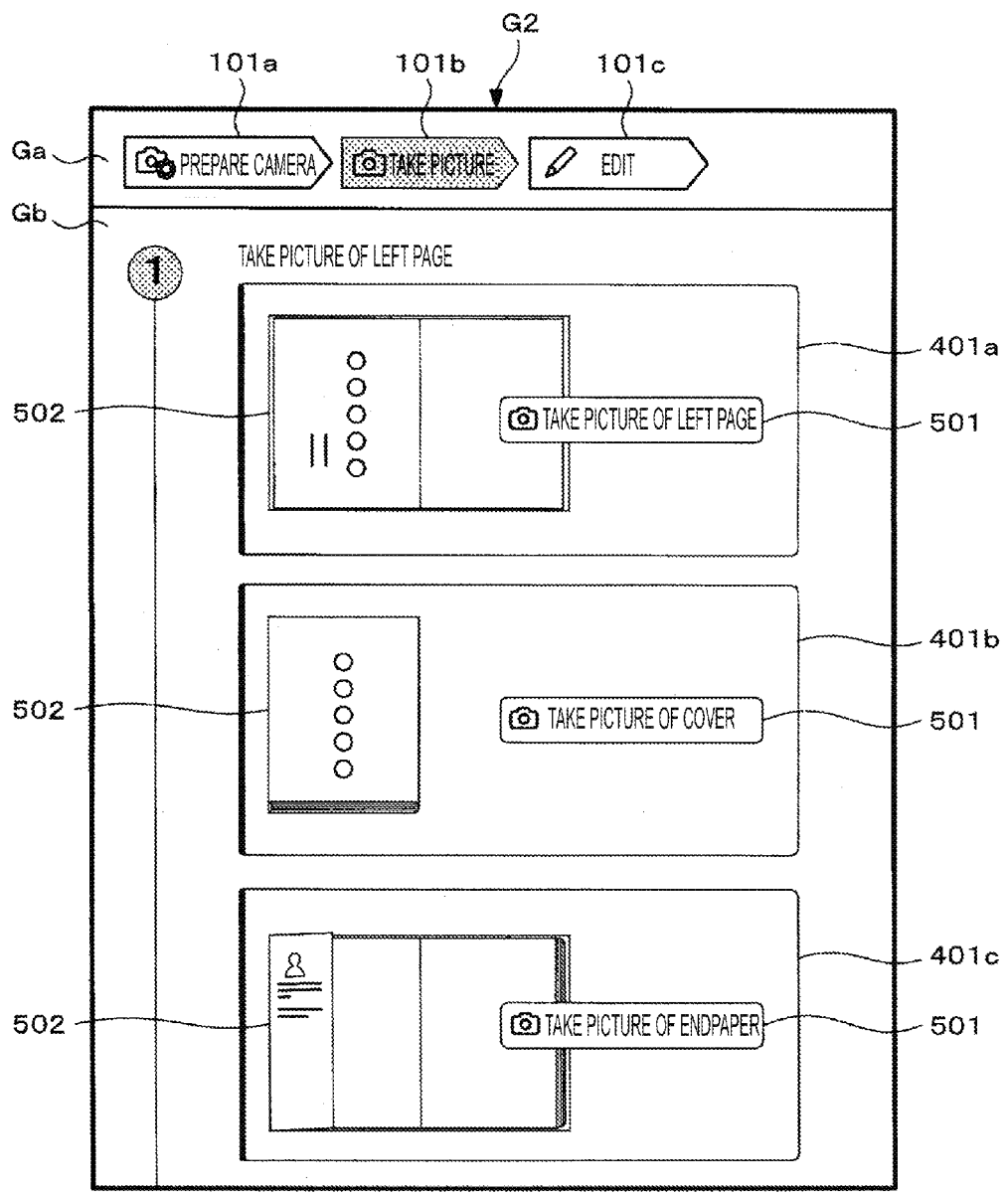
FIG. 9 is a diagram illustrating an imaging operation screen for right-opening spread pages.
Figure 10:
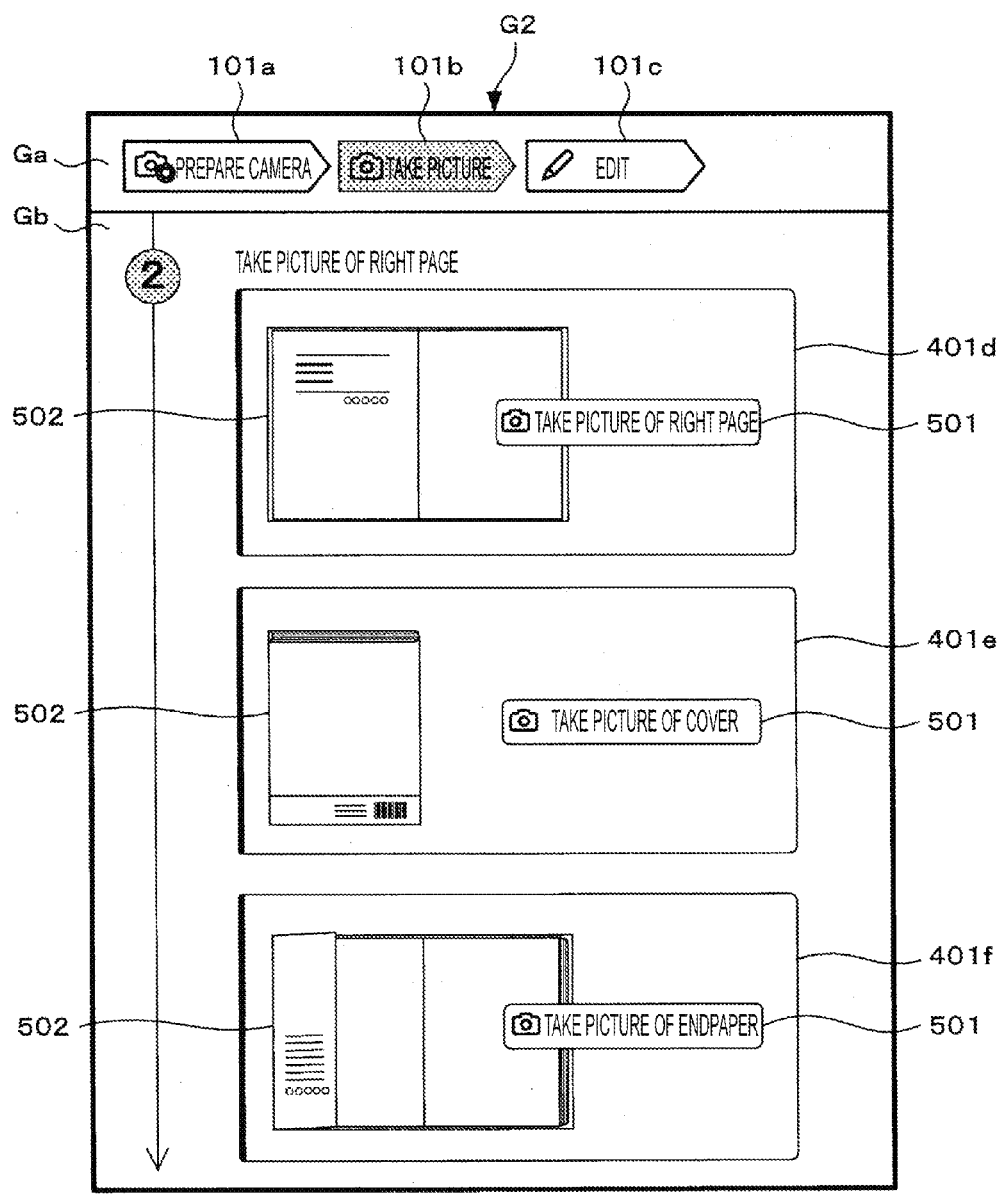
FIG. 10 is a diagram illustrating the imaging operation screen subsequent to that in FIG. 9.

FIGS. 9 and 10 are diagrams illustrating an imaging operation screen G2 for right-opening spread pages displayed in the processing of step SB4. On the imaging operation screen G2 for right-opening spread pages, the second work selection button 101b in a fixed region Ga is reversely displayed, thereby expressly showing that the current work contents are imaging work. Incidentally, this applies also to other imaging operation screens.

The imaging operation screen G2 for right-opening spread pages presents, to the user at a time, an imaging procedure including a plurality of imaging steps upon imaging all pages of a right-binding book (such as a book the body of which is written vertically or a comic book) including a front cover, a back cover, and the like. Incidentally, the imaging procedure presented to the user is a predetermined standard imaging procedure for efficiently performing the imaging work.

The plurality of imaging steps includes the following first to sixth imaging steps. The first imaging step is a step of continuously imaging left pages (odd-numbered pages of the body or the like). The second imaging step is a step of imaging a cover (front cover) of the book. The third imaging step is a step of imaging an endpaper (of a back cover) of the book. The fourth imaging step is a step of continuously imaging right pages (even-numbered pages of the body or the like). The fifth imaging step is a step of imaging a cover (back cover) of the book. The sixth imaging step is a step of imaging an endpaper (of the front cover) of the book.

The imaging operation screen G2 for right-opening spread pages changes to the state illustrated in FIG. 9 or the state illustrated in FIG. 10 by scrolling operation by the user and thereby presents the imaging procedure to the user at a time. That is, on the imaging operation screen G2 for right-opening spread pages, a first imaging object description area 401a to a sixth imaging object description area 401f corresponding to the first to the sixth imaging steps are secured in the scrollable region Gb. In each of the first to the sixth imaging object description areas 401a to 401f, an imaging command button 501 for a user to command to perform imaging in each of the imaging steps by touching operation and an explanatory image 502 are arranged.

The imaging command button 501 displays letters representing the work contents of each of the imaging steps (such as "take picture of left page"). The explanatory image 502 represents a direction of the book B and whether the book B is spread when the book B is placed on the holder 5 of the page turning device 3 upon imaging. Examples of the explanatory image 502 include an illustration or a sample image where an actual book is imaged. Incidentally, when all pages of a right-binding book including a front cover, a back cover, and the like as illustrated in FIG. 10 are imaged, in the fourth to the sixth imaging steps the book B is placed on the holder 5 upside down.

The imaging operation screen for right-opening right pages displayed in the processing of step SB6 presents, to the user at a time, an imaging procedure including a plurality of imaging steps upon imaging only right pages including a back cover and the like of the right-binding book. The plurality of imaging steps includes the first to the third imaging steps, each of which is equivalent to each of the fourth to the sixth imaging steps, respectively, in the aforementioned imaging procedure upon imaging all pages of the right-binding book including a front cover, a back cover, and the like.

On the imaging operation screen for right-opening right pages (not shown), only the fourth imaging object description area 401d to the sixth imaging object description area 401f secured on the imaging operation screen G2 for right-opening spread pages as illustrated in FIG. 10 are secured in the scrollable region Gb.

The imaging operation screen for right-opening left pages displayed in the processing of step SB7 presents, to the user at a time, an imaging procedure including a plurality of imaging steps upon imaging only left pages including a front cover and the like of a right-binding book. The plurality of imaging steps includes the first to the third imaging steps, each of which is equivalent to each of the first to the third imaging steps, respectively, in the aforementioned imaging procedure upon imaging all pages of the right-binding book including a front cover, a back cover, and the like.

On the imaging operation screen for right-opening left pages (not shown), only the first imaging object description area 401a to the third imaging object description area 401c secured on the imaging operation screen G2 for right-opening spread pages as illustrated in FIG. 9 are secured in the scrollable region Gb.

Figure 11:
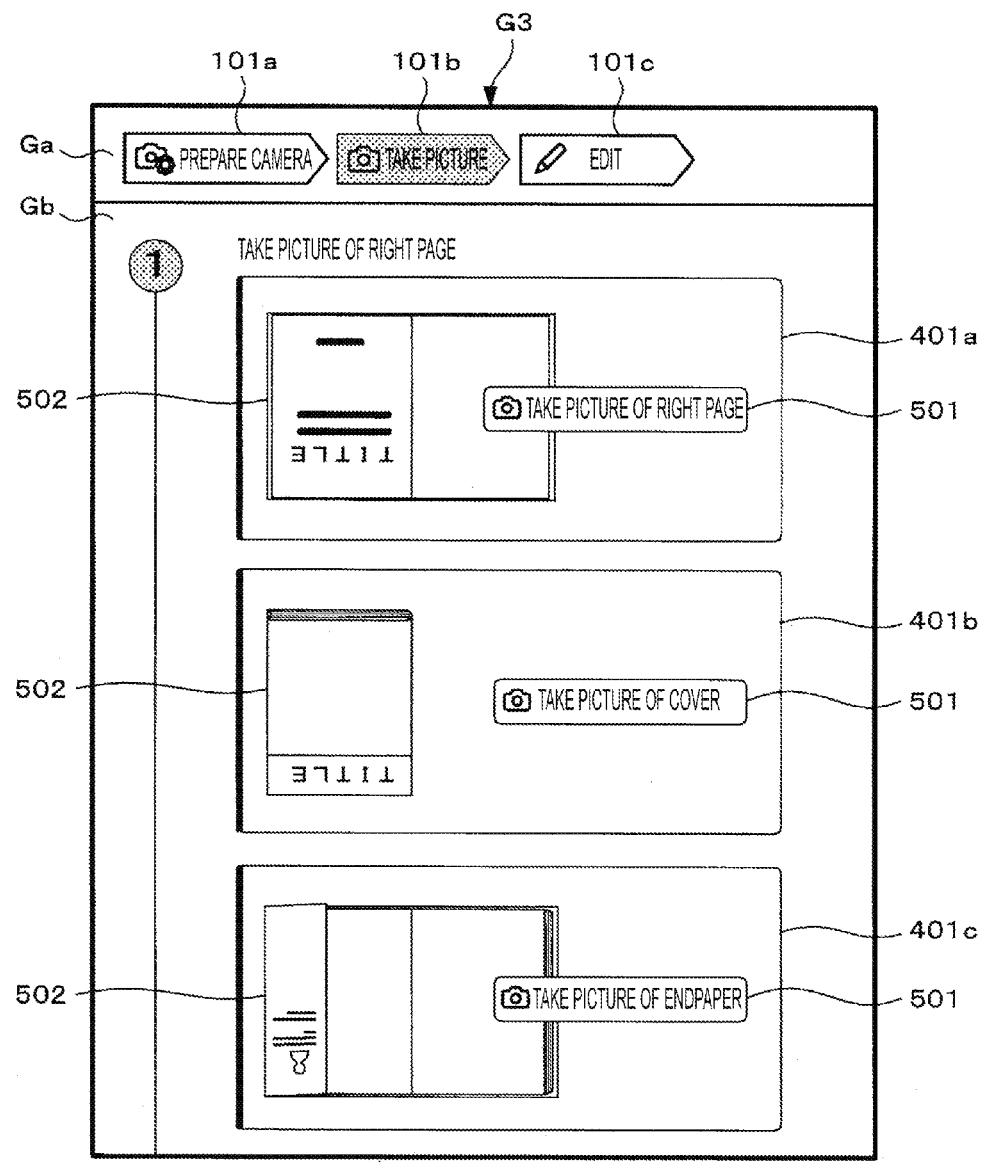
FIG. 11 is a diagram illustrating an imaging operation screen for left-opening spread pages.
Figure 12:
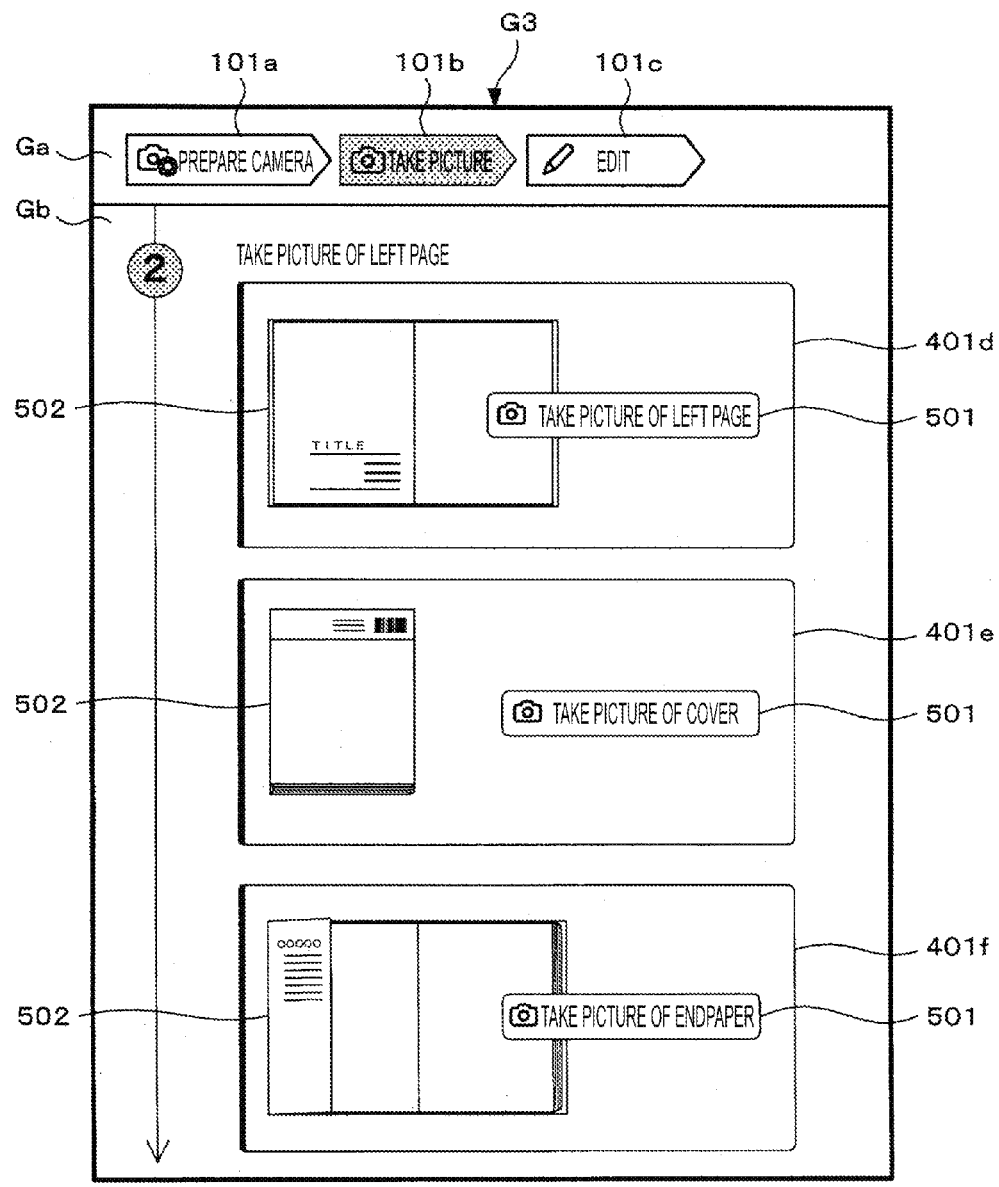
FIG. 12 is a diagram illustrating the imaging operation screen subsequent to that in FIG. 11.

Meanwhile, FIGS. 11 and 12 are diagrams illustrating an imaging operation screen G3 for left-opening spread pages displayed in the processing of step SB9. The imaging operation screen G3 for left-opening spread pages presents, to the user at a time, an imaging procedure including a plurality of imaging steps upon imaging all pages of a left-binding book (such as a book a body of which is written horizontally) including a front cover, a back cover, and the like. Incidentally, the imaging procedure presented to the user is a predetermined standard imaging procedure for efficiently performing the imaging work.

The plurality of imaging steps includes the following first to sixth imaging steps. The first imaging step is a step of continuously imaging right pages (even-numbered pages of the body or the like). The second imaging step is a step of imaging a cover (front cover) of the book. The third imaging step is a step of imaging an endpaper (of a back cover) of the book. The fourth imaging step is a step of continuously imaging left pages (even-numbered pages of the body or the like). The fifth imaging step is a step of imaging a cover (back cover) of the book. The sixth imaging step is a step of imaging an endpaper (of the front cover) of the book.

Like the imaging operation screen G2 for right-opening spread pages, the imaging operation screen G3 for left-opening spread pages changes to the state illustrated in FIG. 11 or the state illustrated in FIG. 12 by scrolling operation by the user and thereby presents the imaging procedure to the user at a time. That is, also on the imaging operation screen G3 for left-opening spread pages, the first imaging object description area 401a to the sixth imaging object description area 401f corresponding to the first to the sixth imaging steps are secured in the scrollable region Gb. In each of the first to the sixth imaging object description areas 401a to 401f, an imaging command button 501 for a user to command to perform imaging in each of the imaging steps by touching operation and an explanatory image 502 are arranged.

Details of the imaging command button 501 and the explanatory image 502 are as described above. Incidentally, when all pages of a left-binding book including a front cover, a back cover, and the like as illustrated in FIG. 11 are imaged, in the first to the third imaging steps the book B is placed on the holder 5 upside down.

The imaging operation screen for left-opening right pages displayed in the processing of step SB11 presents, to the user at a time, an imaging procedure including a plurality of imaging steps upon imaging only right pages including a front cover and the like of the left-binding book. The plurality of imaging steps includes the first to the third imaging steps, each of which is equivalent to each of the first to the third imaging steps, respectively, in the aforementioned imaging procedure upon imaging all pages of the left-binding book including a front cover, a back cover, and the like.

On the imaging operation screen for left-opening right pages (not shown), only the first imaging object description area 401a to the third imaging object description area 401c secured on the imaging operation screen G3 for left-opening spread pages as illustrated in FIG. 11 are secured in the scrollable region Gb.

The imaging operation screen for left-opening left pages displayed in the processing of step SB12 presents, to the user at a time, an imaging procedure including a plurality of imaging steps upon imaging only left pages including a back cover and the like of the left-binding book. The plurality of imaging steps includes the first to the third imaging steps, each of which is equivalent to each of the fourth to the sixth imaging steps, respectively, in the aforementioned imaging procedure upon imaging all pages of the left-binding book including a front cover, a back cover, and the like.

On the imaging operation screen for left-opening left pages (not shown), only the fourth imaging object description area 401d to the sixth imaging object description area 401f secured on the imaging operation screen G3 for left-opening spread pages as illustrated in FIG. 12 are secured in the scrollable region Gb.

After displaying one of the aforementioned imaging operation screens on the display unit 23, the control unit 25 sequentially confirms whether there has been an imaging command by touching operation of the imaging command button 501 by the user and whether there has been a termination command of the imaging work (such as a command to transit to editing by touching operation of the third work selection button 101c) (step SB13 and step SB15).

Thereafter, the control unit 25 stands by until there is an imaging command or a command to terminate the imaging work (NO in step SB13, NO in step SB15). If there is an imaging command (YES in step SB13), the control unit 25 executes imaging of pages in the imaging steps corresponding to the imaging command button 501 subjected to touching operation (step SB14).

Here, for example when the imaging operation screen G2 for right-opening spread pages illustrated in FIG. 9 and FIG. 10 is displayed, the control unit 25 performs the following processing. That is, if the imaging command is that of the first imaging step, the control unit 25 causes the page turning device 3 to repeat the operation of turning over a page while causing the imaging unit 21 to repeat imaging in conjunction with the operation. This allows for storing, in the storage unit 26, captured images of the left pages of the right-binding book (a series of page images). If the imaging command is that of the second imaging step, the imaging unit 21 performs imaging once and the captured image of the cover (front cover) of the right-binding book is stored in the storage unit 26.

Thereafter, the control unit 25 returns to step SB13 and repeats the subsequent processing. The control unit 25 terminates the imaging processing with a command to terminate the imaging work (YES in step SB15).

In the imaging processing described above, by displaying, on the display unit 23, the imaging operation screen corresponding to settings by the user of "turning-over direction" and "printing" (the imaging operation screen for right-opening spread pages, right-opening right pages, right-opening left pages, left-opening spread page, left-opening right pages, or left-opening left pages), the imaging procedure including the plurality of imaging steps corresponding to the settings is presented to the user at a time.

Therefore, the user can perform the imaging work according to the effective imaging procedure only by performing setting of "turning-over direction" and "printing" in advance. Moreover, if the imaging object is "duplex printing" of a book, the user can know in which work stage the user has to turn the book upside down. This allows for performing complicated imaging work including a plurality of steps in an effective manner, thereby enhancing workability of a worker in imaging work associated with digitization of a book.

Incidentally, the plurality of imaging steps corresponding to settings by the user is displayed on the imaging operation screen corresponding to the settings at a time; however, each of the imaging steps may be separately presented to the user according to a progress status of the imaging work. That is, of the first to the sixth imaging object description areas 401a to 401f, the first to the third imaging object description areas 401a to 401c, and the fourth to the sixth imaging object description areas 401d to 401f illustrated in FIGS. 9 and 10 or FIGS. 11 and 12, only a subsequent imaging step may be displayed on the display unit 23 every time processing corresponding to an imaging command is terminated.

Furthermore, in the case where each of the imaging steps is separately presented to the user according to a progress status of the imaging work, each of the imaging steps may be presented to the user not by displaying on the display unit 23 but by voice. Examples of the voice in the above case includes "Next, a picture of a front cover is taken." Imaging in each of the imaging steps in the above case may be performed by determining, as an imaging command, when the user touches any place on the display screen of the display unit 23.

In the present embodiment the case of executing the document management program by the tablet 2 has been described; however, implementation of the functions according to the present invention is not limited thereto but may be achieved with other information devices such as a general personal computer by supplying a program enabling similar processing to that of the aforementioned document management program. Furthermore, a method for supplying the program is arbitrary. For example, the program may be supplied to a personal computer or the like via a web page on the Internet.

The preferable embodiments of the present invention and variations thereof have been described above; however, the present invention is not limited thereto and covers a scope equivalent to the aspects of the invention described in claims.

What is claimed is:

1. A terminal device for (i) controlling operation of a turning device for turning over each of pages of a book to be digitalized, the turning device turning over each page of the book in a spread state from an original position to a destination position, and (ii) imaging a page to be subsequently turned over in the original position, the terminal device comprising:
    an input device configured to accept operations input by a user; and
    a processor configured to implement functions comprising:
        selecting in advance, in accordance with at least one operation input by the user via the input device, at least one setting of the book including a turning-over direction of the book to cause the turning device to turn over each page of the book;
        controlling operation of the turning device according to the at least one setting having been selected and executing a plurality of imaging steps based on the at least one setting; and
        providing, to the user, guidance information related to imaging work that the user is to perform before execution of each of the imaging steps.

2. The terminal device according to claim 1, wherein the at least one setting of the book comprises, as the turning-over direction of the book, a right-to-left turning-over direction or a left-to-right turning-over direction.

3. The terminal device according to claim 1, wherein the guidance information related to the imaging work comprises at least one of information representing continuous imaging of left pages of the book, information representing continuous imaging of right pages of the book, information representing imaging of a cover of the book, and information representing imaging of an endpaper of the book.

4. The terminal device according to claim 1, wherein the guidance information related to the imaging work comprises information of a page as an imaging object and a binding direction when the book is placed on a holder.

5. The terminal device according to claim 1, wherein the providing provides, to the user, an imaging procedure corresponding to the at least one setting of the book having been selected by displaying contents of the imaging steps on a display in an order of execution of the imaging steps.

6. A method for supporting imaging work of a user using (i) a turning device for turning over each of pages of a book to be digitalized, the turning device turning over each page of the book in a spread state from an original position to a destination position, and (ii) a terminal device for controlling operation of the turning device and imaging a page to be subsequently turned over in the original position, the method comprising:
    allowing the user to select in advance, via the terminal device, at least one setting of the book including a turning-over direction of the book to cause the turning device to turn over each page of the book;
    controlling, by the terminal device, operation of the turning device according to the at least one setting having been selected and executing a plurality of imaging steps based on the at least one setting; and providing, to the user by the terminal device, guidance information related to the imaging work that the user is to perform before execution of each of the imaging steps.

7. The method according to claim 6, wherein the at least one setting of the book comprises, as the turning-over direction of the book, a right-to-left turning-over direction or a left-to-right turning-over direction.

8. The method according to claim 6, wherein the guidance information related to the imaging work comprises at least one of information representing continuous imaging of left pages of the book, information representing continuous imaging of right pages of the book, information representing imaging of a cover of the book, and information representing imaging of an endpaper of the book.

9. The method according to claim 6, wherein the guidance information related to the imaging work comprises information of a page as an imaging object and a binding direction when the book is placed on a holder.

10. The method according to claim 6, wherein the imaging work comprises work of reversing a binding direction of the book placed on a holder.

11. The method according to claim 6, wherein the providing provides, to the user as the guidance information, contents of the imaging steps corresponding to the at least one setting of the book having selected.

12. The method according to claim 6, wherein the providing provides, to the user, an imaging procedure corresponding to the at least one setting of the book having been selected by displaying contents of the imaging steps on a screen in an order of execution of the imaging steps.

13. The method according to claim 12, wherein the providing provides, to the user, the imaging procedure according to the at least one setting of the book having been selected by displaying the contents of the imaging steps on the screen one at a time in the order of execution of the imaging steps.

14. The method according to claim 12, wherein the providing provides, to the user, the imaging procedure according to the at least one setting of the book having been selected by separately displaying the contents of the imaging steps on the screen according to a progress status of the imaging procedure.

15. The method according to claim 6, wherein the providing displays, on a screen, contents of the imaging steps by associating the contents with an operation button for commanding execution of each of the imaging steps.

16. A non-transitory computer-readable storage medium having stored thereon a program executable by a processor for controlling operation of (i) a turning device for turning over each of pages of a book to be digitalized, the turning device turning over each page of the book in a spread state from an original position to a destination position, and (ii) a terminal device for imaging a page to be subsequently turned over in the original position, the program controlling the processor to perform functions comprising:
    allowing a user to select in advance, via the terminal device, at least one setting of the book including a turning-over direction of the book to cause the turning device to turn over each page of the book;
    controlling operation of the turning device according to the at least one setting having selected and executing a plurality of imaging steps based on the at least one setting; and
    providing, to the user, guidance information related to imaging work that the user is to perform before execution of each of the imaging steps.

17. The non-transitory computer-readable storage medium according to claim 16, wherein the at least one setting of the book comprises, as the turning-over direction of the book, a right-to-left turning-over direction or a left-to-right turning-over direction.

18. The non-transitory computer-readable storage medium according to claim 16, wherein the guidance information related to the imaging work comprises at least one of information representing continuous imaging of left pages of the book, information representing continuous imaging of right pages of the book, information representing imaging of a cover of the book, and information representing imaging of an endpaper of the book.

19. The non-transitory computer-readable storage medium according to claim 16, wherein the guidance information related to the imaging work comprises information of a page as an imaging object and a binding direction when the book is placed on a holder.

20. The non-transitory computer-readable storage medium according to claim 16, wherein the providing provides, to the user, an imaging procedure corresponding to the at least one setting of the book having been selected by displaying contents of the imaging steps on a display in an order of execution of the imaging steps.

* * * * *